No. 655,405. Patented Aug. 7, 1900.
H. A. LUTTGENS.
LOCOMOTIVE.
(Application filed Sept. 25, 1896.)
(No Model.) 2 Sheets—Sheet 1.
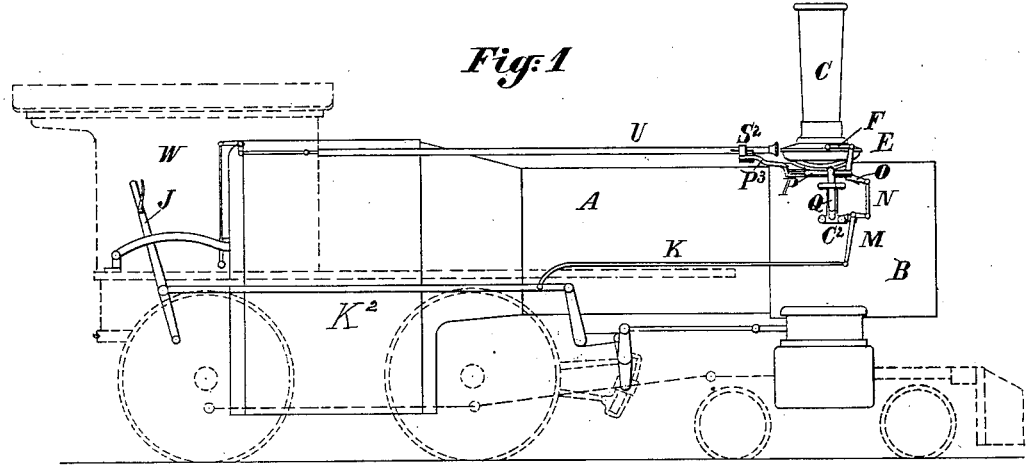
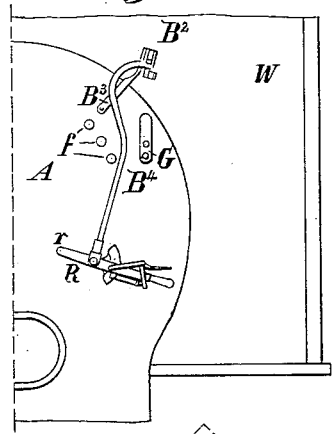
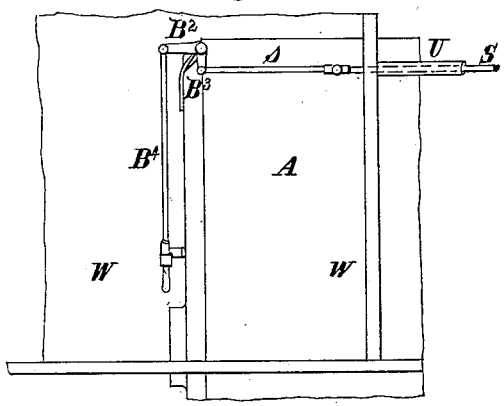
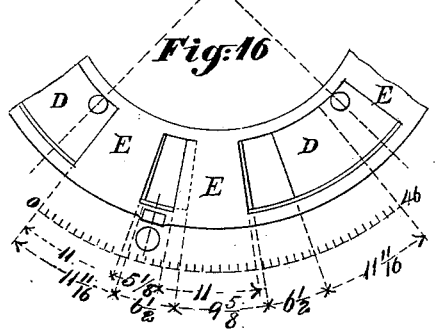
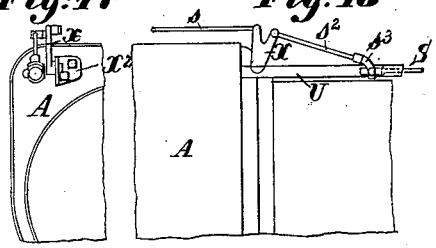
WITNESSES:
Randolph C. Luttgens
Louise H. Luttgens
INVENTOR:
Henry A. Luttgens No. 655,405. Patented Aug. 7, 1900.
H. A. LUTTGENS.
LOCOMOTIVE.
(Application filed Sept. 25, 1896.)
(No Model.) 2 Sheets—Sheet 2.
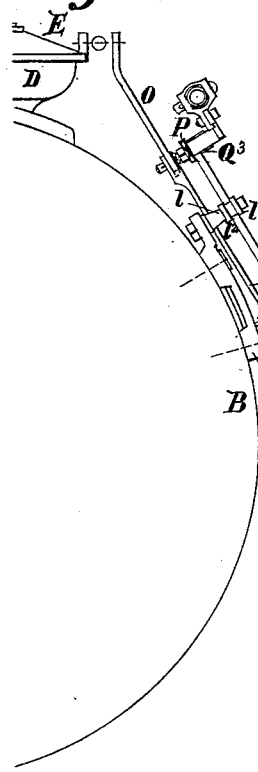
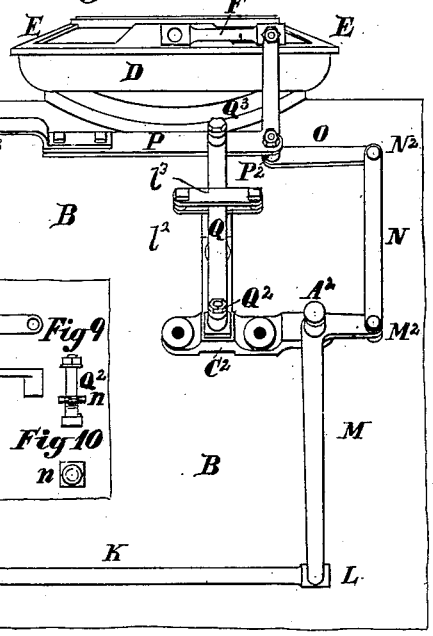
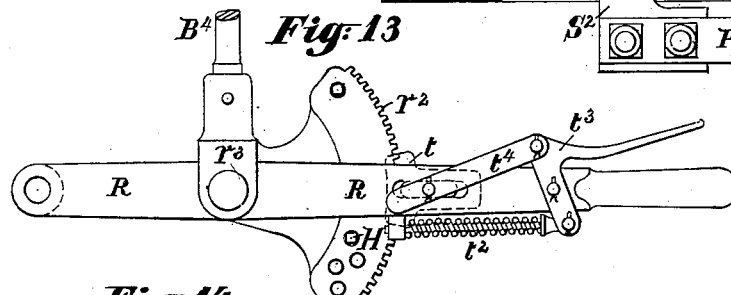
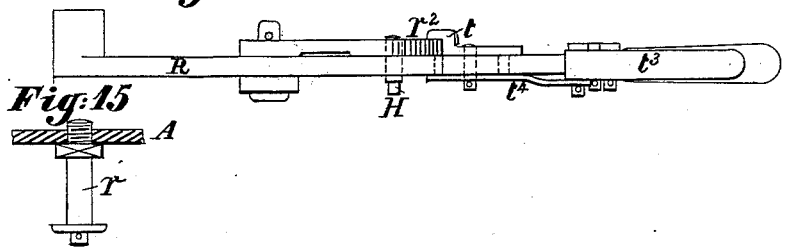
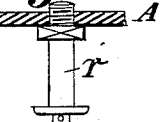
WITNESSES:
Randolph C. Luttgens
Louise H Luttgens
INVENTOR.
Henry A. Luttgens

UNITED STATES PATENT OFFICE.

HENRY A. LUTTGENS, OF PATERSON, NEW JERSEY.

LOCOMOTIVE.

SPECIFICATION forming part of Letters Patent No. 655,405, dated August 7, 1900.

Application filed September 25, 1896. Serial No. 607,006. (No model.)

*To all whom it may concern:*

Be it known that I, HENRY A. LUTTGENS, of the city of Paterson, county of Passaic, and State of New Jersey, have invented certain new and useful Improvements in Locomotives, of which the following is a specification.

My invention relates to locomotives, the object of the invention being to improve the apparatus shown and described by Letters Patent granted to me on the 10th day of November, 1885, and the 5th day of February, 1895, and designated by Nos. 330,340 and 533,544, respectively.

With this object in view the invention consists in certain novel features of construction and combinations and arrangements of parts, as hereinafter set forth, and pointed out in the claims.

In the accompanying drawings, Figure 1 is a general side elevation showing all the parts pertaining to my invention, with so much of the ordinary parts of a locomotive as are necessary to indicate their relation thereto. Fig. 2 is the rear end elevation of part of a locomotive; and Fig. 3 is a side elevation of the same, on a larger scale, showing so much of the device as is attached to this part of the engine. Fig. 4 is an end elevation, and Fig. 5 a side elevation, of the smoke-box, on a still larger scale, showing parts attached to the smoke-box. Fig. 6 represents a side elevation, and Fig. 7 a plan, of a part of the smoke-box fixtures; Fig. 8, a detail portion in elevation which belongs to the last fixtures; Figs. 9 and 10, additional details in elevation and plan. Figs. 11 and 12 represent a side elevation, partly in section, and an end elevation, of another portion of the smoke-box fixtures. Fig. 13 shows a side elevation, and Fig. 14 a plan, and Fig. 15 a detail view, on a larger scale, of parts shown in Figs. 2 and 3 which belong to the rear part of the locomotive. Fig. 16 is a plan view of a portion detached. Fig. 17 is part of an end elevation, and Fig. 18 a side elevation, showing modification of parts attached to the locomotive-boiler at the place where the cylindrical part of the boiler connects with the fire-box shell.

Similar letters of reference indicate corresponding parts in all the figures where they appear.

In the drawings, A is the boiler, B the smoke-box, C the smoke-stack, U the hand-rail, W the cab, and D the stack-base, of a locomotive.

The movements of the reversing-rod $K^2$ imparted by the adjustments of the reverse-lever J communicate by rod K, fitted with ball-joint L, to the lower arm of lever M, which latter is fulcrumed at $A^2$. It connects by pin $M^2$ to link N and by pin $N^2$ to a second lever O, which is fulcrumed at $P^2$ to the sliding bar P. The upper end of the lever O connects by link F to the damper-plate E. The link F is fitted with ball-joints at both ends. The sliding bar P is connected, as in the Patent No. 533,544, with rod S, operated from the cab.

The main support of the horizontally-sliding bar P, which support takes the place of the casting shown in the Patent No. 533,544, is a vertical link Q. It is pivoted at its lower end upon pin $Q^2$ and connected at its upper end to bar P by pin $Q^3$. Pin $Q^2$ is secured to and supported by casting $C^2$, which is bolted to the smoke-box B. The lever Q is pivoted to the front end of the sliding bar P, which latter at its rear end is connected directly by means of an extension $P^3$ to the rod S at joint $S^2$, so that its connection with the rod S at $S^2$ gives a second support to bar P, which keeps the horizontally-sliding bar P in its proper position.

The link Q is shown in detail by Figs. 6 and 7 and its fulcrum-pin $Q^2$ by Figs. 9 and 10. This pin enters the casting from the under side and is secured to it by a square nut $n$, and its pin-shaped part beyond this nut receives the lower end of the vertical link Q, the upper end of which is secured to bar P by pin $Q^3$, which pin is shown by Fig. 8.

The casting $C^2$ supports, by means of a short column $l$ and bars $l^2$ and $l^3$, the vertical link Q near its upper end.

The extension $P^3$ of the sliding bar P is fitted to adapt itself to the position of the hand-rail.

Figs. 11 and 12 illustrate in detail and on a larger scale the joint $S^2$, united by pin $p$ to rod S. The joint $S^2$ is firmly bolted to the horizontal extension-bar $P^3$.

The cab adjustment shown in Fig. 3 (after the rod S passes beyond the hand-rail U, where it enters the cab W) is connected by means of link s to a bell-crank B², which is supported by bracket B³, secured to the back shell of the boiler.

A rod B⁴, bent to avoid the gage-cocks f and the air-brake valve (not shown) supported by bracket G, is connected to a lever R, which is conveniently placed to be operated by the engineer and fireman.

The lever R, which is fulcrumed upon pin r to the boiler A, Fig. 2, is shown in detail by Figs. 13, 14, and 15. Segment r² is cast to the joint r³, which connects with rod B⁴, so that when latch t enters the teeth provided in the segment (by means of the pressure supplied by spring t²) the lever R is locked firmly in its position wherever placed. The movement and pressure of the spring t² are communicated to latch t by means of handle t³ and link t⁴ as soon as the handle is released. Upon one side of lever R the segment r² in its solid part is provided with holes, as shown, for changes in the position of stop H.

The holes in the damper-plate E and the stack-base D may be arranged as shown in Patent No. 533,544, the same as shown in Fig. 16.

The available space for the movement of the damper-plate E, with due regard for the expansion and contraction of the boiler, is for each quarter-section divided into forty-six parts, indicated by figures in the drawings. The plate E is provided with four holes for the admission of air into the stack-base, or one hole in each quarter-section, five and one-eighth parts, and the webs inclosing each hole, eleven parts.

The stack-base D is provided with eight holes, or two holes for each quarter-section, placed centrally as regards the four studs which secure the smoke-stack C. The space between each pair of holes is nine and five-eighths parts and the holes six and one-half parts.

The adjustable stop H is provided to change the relative proportion between the automatic adjustment by the reverse-rod K² and the adjustment from the cab by the attendant. The relative proportion as given in the Patent No. 533,544 is as fifty-seven to seven, or fifty-seven for the reverse-rod adjustment to seven of the cab adjustment. Then the permanent automatic adjustment will close the stack-base openings at about seventeen inches out of twenty-six-inch stroke, and, by means of the extreme position of the cab adjustment, these openings can be finally made to close at about seven inches cut-off for twenty-six inch stroke of piston. If the proportion as given above—fifty-seven to seven—is changed to the proportion of two to one, then the permanent automatic adjustment will close the stack-base openings near twenty-three and three-fourths out of twenty-six inch stroke of piston, and in the extreme position of the adjustment from cab it will close the openings beyond the central position of the reverse-lever, (central as regards the forward and backward movement of the locomotive-engine,) so that when the cab-adjustment lever is so placed in its extreme position air will be admitted into the stack-base through a small opening.

The proportion of two to one, as given above, opens the way for a greater or less range in the automatic adjustment by means of the reverse-lever than can be obtained with the proportion of fifty-seven to seven.

The stop H, when placed nearer the center of the segment r² of the lever R, increases the permanent adjustment of the reverse-rod K², since by the train of mechanism uniting the lever R, consisting of vertical rod B⁴, bell-crank B², horizontal rod S, sliding bar P, lever O, and link N, which unites with damper-plate E, the latter is placed in a position that when acted upon by the permanent adjustment of the reverse-rod K² the openings for the admission of air into the stack-base will close later for the forward motion of the engine than if the cab-adjusting lever R is placed in the one extreme position provided for in the Patent No. 533,544. By these means a longer range of permanent adjustment (by means of the reverse-rod K²) is obtained, which cannot be reduced by the cab-lever R. The permanent adjustment, however, can be changed by placing the stop H nearer to or in the extreme position provided for the adjustment of the removable stop H.

The advantage derived from the use of stop H is to obtain as much positive adjustment by means of the changes in the position of the reverse-lever J as is practicable under the circumstances, as in some cases the cab adjustment from want of attention may be entirely neglected. Also the easy change in the position of stop H will enable the attendant to change the extent of the positive adjustment when necessary.

The cab-lever arrangement on the top of the locomotive-boiler shown in Patent No. 533,544 is suitable for hard-coal-burning engines, where the necessary attention in attending to the fire requires less time than for soft-coal-burning engines. On soft-coal-burning engines the cab-adjusting lever, which modifies the range of adjustment by means of the reverse-lever K, should be placed in front of the fireman and, as far as practicable, also within easy reach of the engineer. To accomplish this, the fulcrum of lever R is secured to the boiler above the fire-door and connected by a vertical rod B⁴ to bell-crank lever B², which changes the direction of the movement communicated by horizontal link s, rod S, sliding bar P, lever O, and link N to the damper-plate E, so that the adjustments of the cab-lever R are thereby communicated to the damper-plate E. Instead of the casting shown in Patent No. 533,544 I now place a vertical link Q at the side of the smoke-box of the locomotive-boiler to support the sliding bar P. Link Q is secured to bar P, which latter has a second support by means of extension-bar P³, secured by pin p to rod S.

The advantage of the support of bar P and extension P³ by means of the vertical link Q is that it can be adjusted by proper fitting to the position of the hand-rail U with less joints than by the parts shown in Patent No. 533,544, and the free movement of the link Q is not so apt to be hindered as the movement of a slide when closely fitted in a casting, as shown in Patent No. 533,544.

Modifications may be made without departing from the principle or sacrificing the advantages of the invention.

A modification in the extension of the long rod S is shown in Figs. 17 and 18. It is needed where on account of the shape of the boiler the extension $s$ of rod S must be diverted from a straight line. The link $s^2$ by means of joint $s^3$ connects to rod S, which latter is connected to a second bell-crank $x$, secured by bracket $x^2$ to the front end of the fire-box shell of boiler A. Also the link $s$ is connected to bell-crank $x$.

I claim as my invention—

1. In a locomotive, the combination with a damper at the base of the stack, valve-gear, a lever and connections between said lever and the damper and valve-gear, of a second lever pivoted at one end, a coupling attached to said second lever, a rod attached to said coupling, connections between said rod and the damper, a toothed segment on said coupling, a dog carried by said second lever and engaging said segment, said segment having a series of sockets at one side of the lever and a pin adapted to be placed in one or another of said sockets to limit the throw of the second lever and of the damper when the first lever is operated.

2. In a locomotive, the combination of a damper at the base of the stack, and valve-gear, of a bracket on the smoke-box, an arm pivoted to said bracket, guide-plates on the bracket for said arm, a slide pivotally connected with the upper end of said arm, a rod mounted in the hand-rail of the locomotive, a connection between said rod and the slide and serving to assist in supporting the latter, an adjusting device connected with said rod, connections between said slide and damper, an operating-lever and devices connecting said lever with the valve-gear and also with said slide.

HENRY A. LUTTGENS.

Witnesses:
RANDOLPH C. LUTTGENS,
LOUISE H. LUTTGENS.